(12) United States Patent
Perkins

(10) Patent No.: US 11,500,451 B2
(45) Date of Patent: Nov. 15, 2022

(54) SYSTEM AND METHOD FOR AUGMENTED REALITY VIA DATA CROWD SOURCING

(71) Applicant: VERIZON PATENT AND LICENSING INC., Basking Ridge, NJ (US)

(72) Inventor: Kevin Perkins, Champaign, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/372,790

(22) Filed: Apr. 2, 2019

(65) Prior Publication Data
US 2020/0319702 A1 Oct. 8, 2020

(51) Int. Cl.
*G06F 3/01* (2006.01)
*G06T 19/00* (2011.01)
*G02B 27/01* (2006.01)

(52) U.S. Cl.
CPC .......... *G06F 3/011* (2013.01); *G02B 27/0101* (2013.01); *G06T 19/006* (2013.01); *G06T 2219/024* (2013.01)

(58) Field of Classification Search
CPC ... G06F 3/011; G02B 27/0101; G06T 19/006; G06T 2219/024
See application file for complete search history.

(56) References Cited

U.S. PATENT DOCUMENTS 10,147,399 B1 * 12/2018 Mott ...................... G09G 5/377
2018/0124293 A1 * 5/2018 Cohen .................. H04N 5/2252

* cited by examiner

Primary Examiner — Roy P Rabindranath

(57) ABSTRACT

The present teaching relates to method, system, medium, and implementations for augmenting data via data crowd sourcing. Local data are acquired by one or more sensors deployed on a first device. Augmented data are obtained where such augmented data are generated based on the local data and remote data from at least one second device and are rendered on the first device.

20 Claims, 17 Drawing Sheets

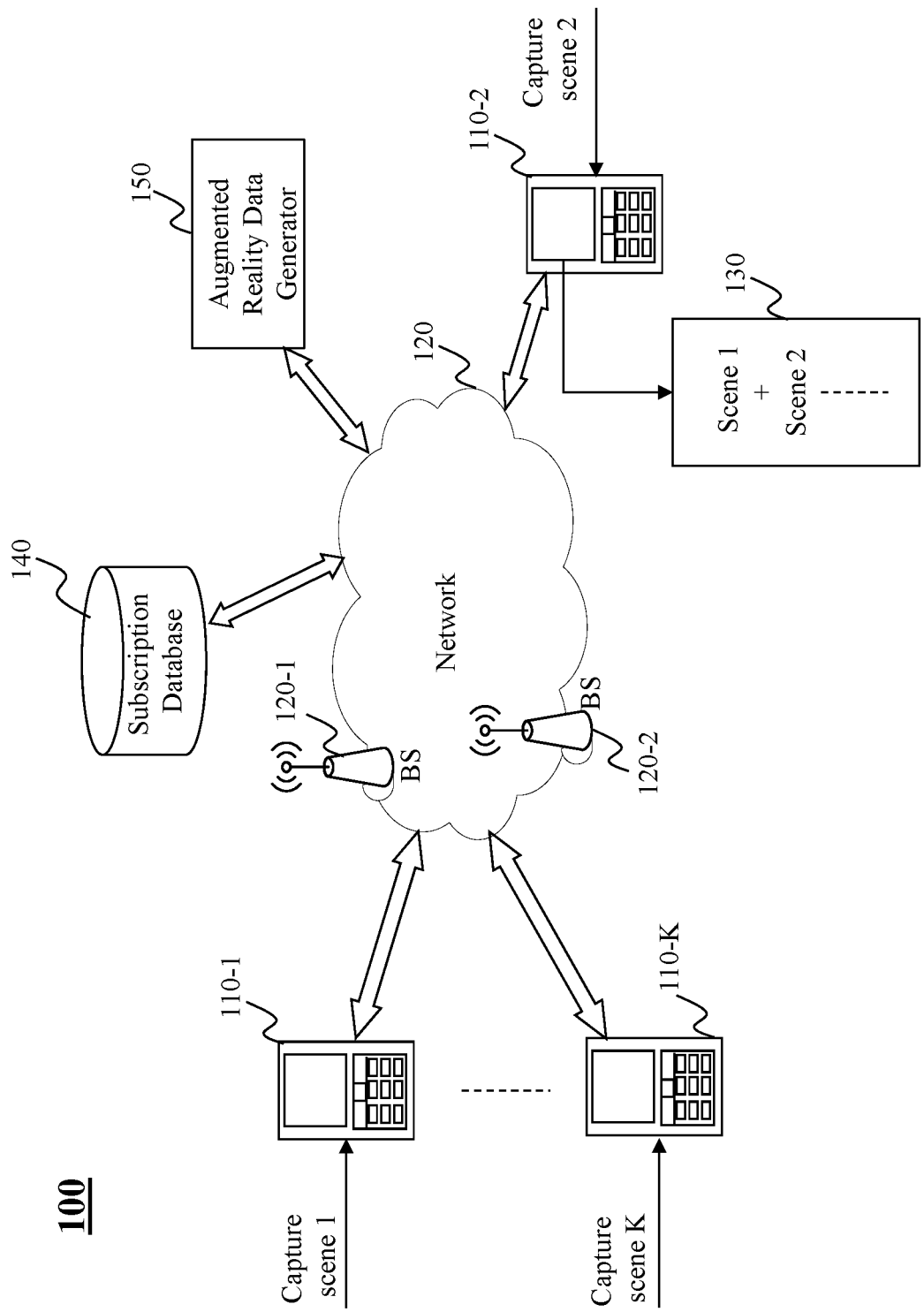

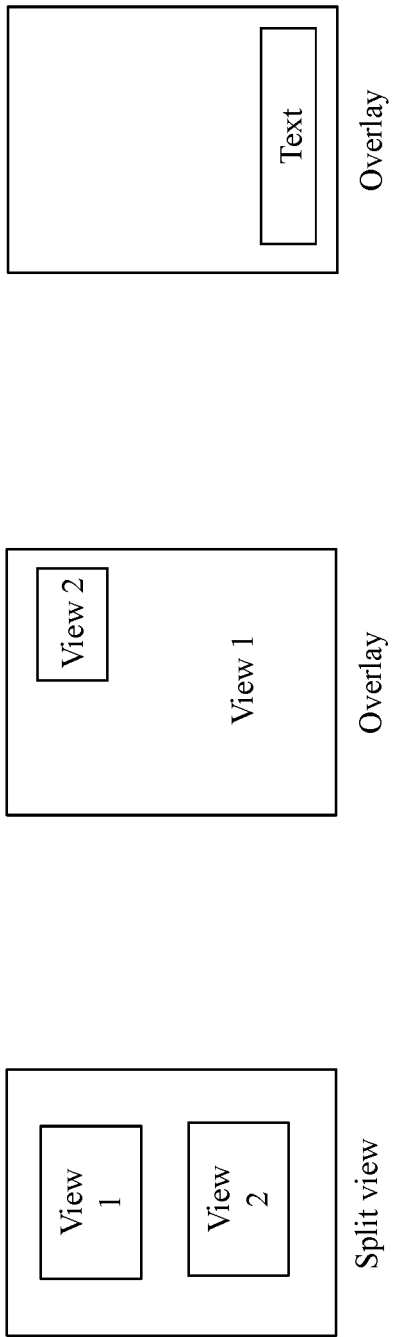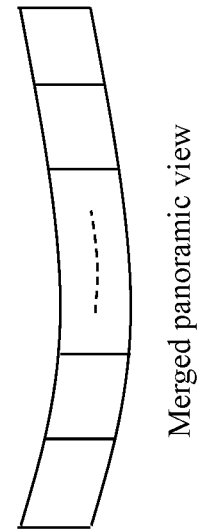

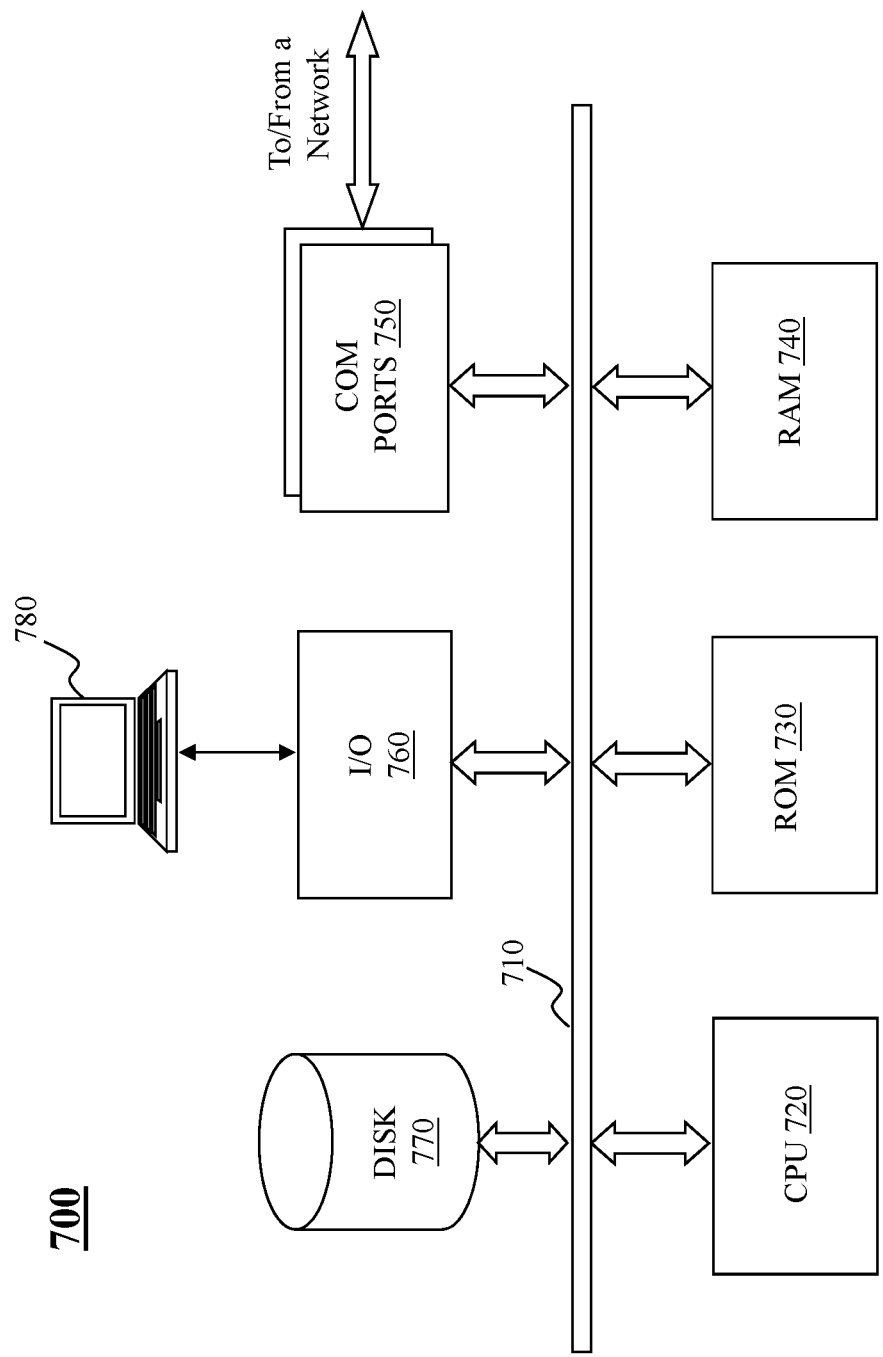

SYSTEM AND METHOD FOR AUGMENTED REALITY VIA DATA CROWD SOURCING

BACKGROUND

1. Technical Field

The present teaching generally relates to augmented reality. More specifically, the present teaching relates to generating augmented reality via data crowd sourcing.

2. Technical Background

Because of the ubiquitous network connectivity and ever growing availability of handheld devices, the network enabled communications have exploded in the last decade. In addition to that, the increasingly advanced powers of handheld devices such as smart phones, notes, and tablets have also allowed users of such devices to create and consume different media content at people's fingertips. As known, today's handheld devices provide much power, speed, and memory so that users can record audios, pictures, and videos of extended length and store either locally on the devices or remotely in the clouds for sharing and consumption. For example, a person attending a football game may record clips of videos and transmit them to friends and families who cannot attend the game. Family photos may be uploaded in the cloud and family members who live in thousands of miles away may enjoy the photos.

In some events, a view represented by a video taken by a person sitting at a one location may be limited to the observations and such a view may not provide the most pertinent information. Such a restriction may limit the value of the usage of the video taken there. As another example, an audio track of a video taken from a location of a game may be mostly noise because of the constant cheering from the nearby audience at the location, affecting the value of the video even if the pictures are of high value. Although professionals may be present at the location of an interesting event and may be able to generate an after-fact video incorporating multiple views of the same event, such professionally generated videos are often expensive and may be difficult to share with others.

Thus, there is a need for methods and systems that address such limitations.

SUMMARY

The teachings disclosed herein relate to methods, systems, and programming for augmented reality.

In one example, a method, implemented on a machine having at least one processor, storage, and a communication platform capable of connecting to a network for augmenting data via data crowd sourcing. Local data are acquired by one or more sensors deployed on a first device. Augmented data are obtained where such augmented data are generated based on the local data and remote data from at least one second device and are rendered on the first device.

In a different example, a system for augmenting data via data crowd sourcing. The system includes a data selector configured for acquiring local data from one or more sensors deployed on a first device, an augmented data generation controller configured for controlling obtaining augmented data generated based on the local data and remote data from at least one second device, and an augmented data renderer configure for rendering the augmented data on the first device.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon for augmenting data via crowd sourcing, wherein the medium, when read by the machine, causes the machine to perform a series of steps. Local data are acquired by one or more sensors deployed on a first device. Augmented data are obtained where such augmented data are generated based on the local data and remote data from at least one second device and are rendered on the first device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1A depicts a networked environment for facilitating generation of augmented reality data via crowd sourcing, in accordance with an embodiment of the present teaching;

FIGS. 2B-2E illustrates corresponding exemplary augmented reality views generated via crowd sourcing, in accordance with an embodiment of the present teaching;

FIG. 7 is an illustrative diagram of an exemplary computing device architecture that may be used to realize a specialized system implementing the present teaching in accordance with various embodiments.

DETAILED DESCRIPTION

Figure 1B:
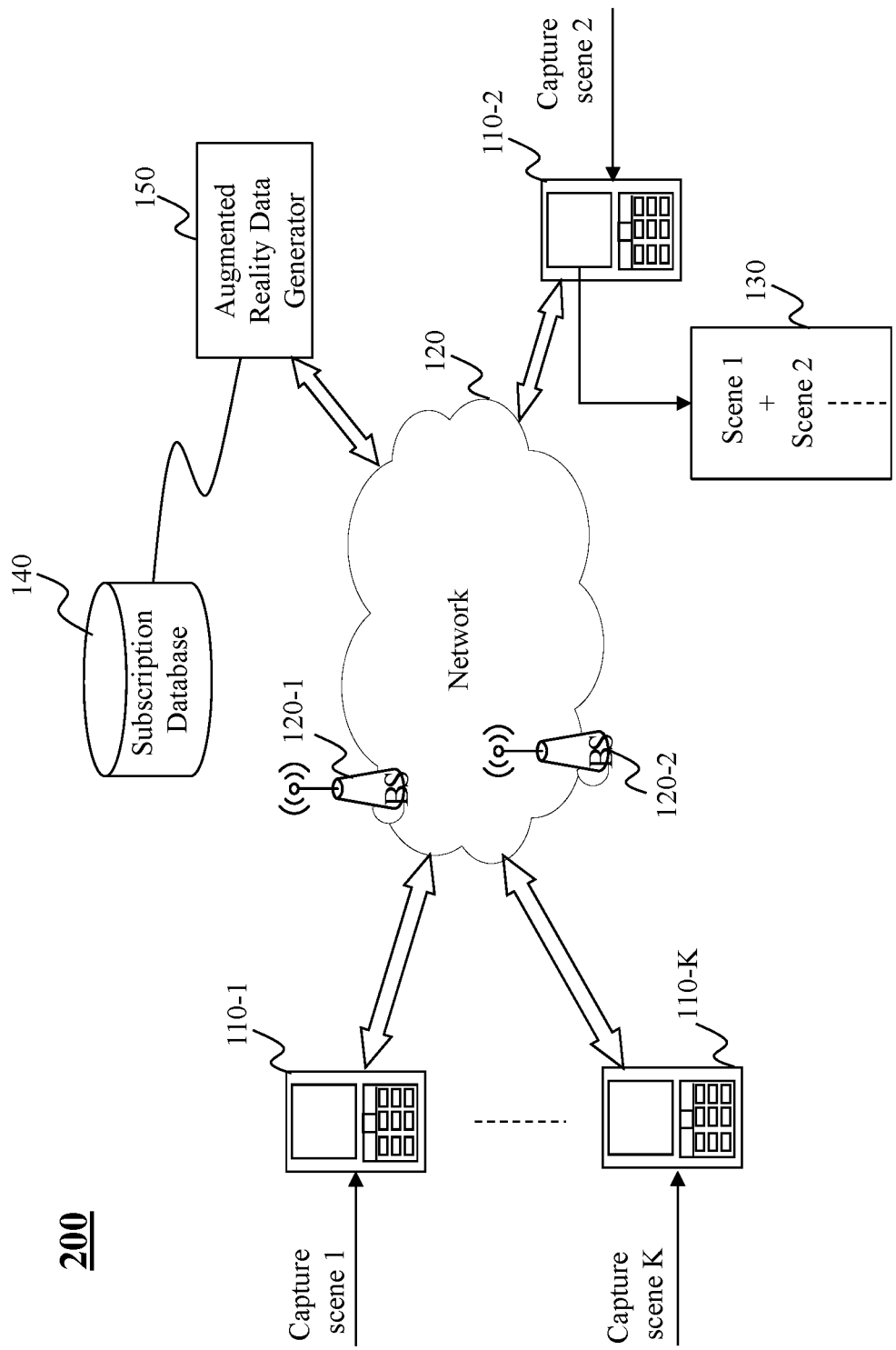
FIG. 1B depicts an alternative networked arrangement for facilitating generation of augmented reality data via crowd sourcing, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to address the deficiencies of the traditional approaches in utilizing the diversified data captured by ubiquitous devices to enrich the data from individual sources. The present teaching discloses embodiments by which data at different sources can be crowd sourced in a dynamic manner and used to generate augmented reality data that are needed by individual devices.

FIG. 1A depicts a networked framework 100 for facilitating generation of augmented reality data via crowd sourcing, in accordance with an embodiment of the present teaching. In this illustrated embodiment, the framework 100 comprises a plurality of individual devices 110-1, 110-2, ..., 110-K, an augmented reality data generator 150, a subscription database 140, and a network 120 connecting the above mentioned components. In operation, each of the individual devices is located at a physical location and capable of capturing data surrounding the physical location (e.g., a scene). The captured data can be static such as a photo or a data stream such as video, audio, or text. At least some of the devices may make its captured data available to other devices via the network 120. Any device in the framework 100 can receive data/data streams captured by other devices and made available to it. Such data from multiple devices (sources) may be crowed sourced together at any of the individual devices and be used to generate augmented reality data. In some embodiments, the augmented reality data generator 150 serves as a server that may be configured to generate augmented reality data based on crowed sourced data from the individual devices 110-1, ..., 110-K in a centralized manner and distribute both in accordance with subscriptions of different users or user groups of such individual devices 110 stored in a subscription database 140.

In the framework 100, each individual device may be of different types to facilitate a user operating the device to connect to network 120 and transmit/receive signals. Such a user device may correspond to any suitable type of electronic/computing device including, but not limited to, a desktop computer, a mobile device, a device incorporated in a transportation vehicle, ..., a mobile computer, or a stationary device/computer. A mobile device may include, but is not limited to, a mobile phone, a smart phone, a personal display device, a personal digital assistant ("PDAs"), a gaming console/device, a wearable device such as a watch, a Fitbit, a pin/broach, a headphone, etc. A transportation vehicle embedded with a device may include a car, a truck, a motorcycle, a boat, a ship, a train, or an airplane. A mobile computer may include a laptop, an Ultrabook device, a handheld device, etc. A stationary device/computer may include a television, a set top box, a smart household device (e.g., a refrigerator, a microwave, a washer or a dryer, an electronic assistant, etc.), and/or a smart accessory (e.g., a light bulb, a light switch, an electrical picture frame, etc.).

As illustrated, the network 120 connects all parties involved. In some embodiments, network 120 may correspond to a single network or a combination of different networks. For example, network 120 may be a local area network ("LAN"), a wide area network ("WAN"), a public network, a proprietary network, a proprietary network, a Public Telephone Switched Network ("PSTN"), the Internet, an intranet, a Bluetooth network, a wireless network, a virtual network, and/or any combination thereof. In one embodiment, network 120 may also include various network access points. For example, the framework 100 may include wired or wireless access points such as, without limitation, base stations or Internet exchange points 120-1, ..., 120-2. Base stations 120-1, ..., 120-b may facilitate, for example, communications to/from individual devices 110 and/or the augmented reality data generator 150 with one or more other components in the networked framework 100 across different types of network. In FIG. 1A, an exemplary type of augmented reality data is illustrated on individual device 110-2 as a merged scene incorporating both scene 1 and scene 2, each of which is acquired by a different individual device and crowd sourced together to generate an augmented reality display of scene 1+scene 2. More data streams may be also be crowd sourced and incorporated at a single individual device to generate augmented reality data.

The subscription database 140 may be independently or stand-alone and connected to the network 120. In this way, any of the individual devices may submit their subscription data across the network 120 and store in database 140. On the other hand, the content in the subscription database 140 may also be accessible to any of the components connected to the network 120. This includes the augmented reality data generator 150 and the individual devices 110. FIG. 1B depicts an alternative networked framework 200 for facilitating generation of augmented reality data via crowd sourcing, in accordance with an embodiment of the present teaching. In this embodiment, the subscription database 140 is connected to the augmented reality data generator 150 as a backend supporting component. In this arrangement, any access to the subscription database, including reading content, writing content, or modifying content in the subscription database 140 is to through the augmented reality data generator 150.

Figure 1C:
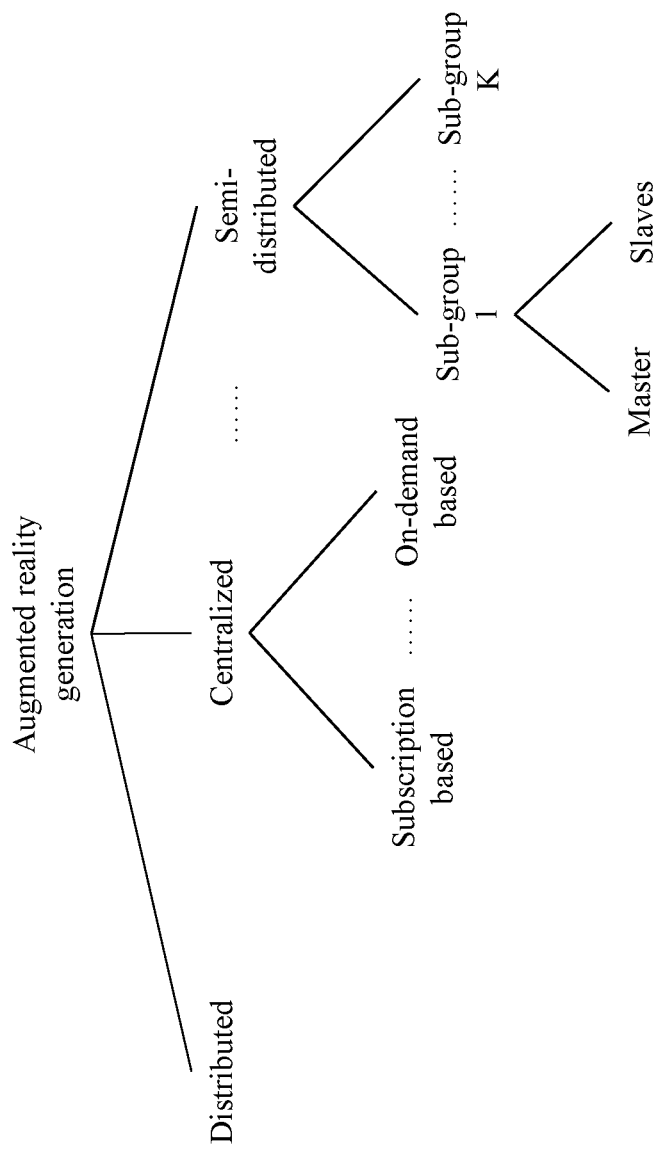
FIG. 1C illustrates exemplary schemes of generating augmented reality data via crowd souring, in accordance with an embodiment of the preset teaching.

FIG. 1C illustrates exemplary schemes of generating augmented reality data via crowd souring, in accordance with an embodiment of the preset teaching. As discussed herein, each individual device may be configured to conduct crowd sourcing of data from other individual devices across the network and generate at the device augmented reality data. This may be termed as distributed crowd sourcing based augmented reality data generation. For instance, a user operating an individual device sitting in the front row of a game may combine its own data stream captured at the front row (with a wider field of view of the game so that it captures more details of some parts of the scene but lacking the overall dynamics of the game playing) with a data stream captured by another user operating a different device and sitting in the back row (with a more narrow field of view with less details of specific part of the scene but capturing the overall dynamics of all players in the entire field) to generate an augmented data stream that superimposes the wider angle view of specific details of some parts of the sports field on a part of the overall scene of the game (e.g., up right corner of the overall scene). In this mode of operation, each device may specify its own criteria directed to which data stream(s) from other devices to be selected for generating augmented reality data. For instance, a device may limit data streams from other two devices whose connection with the device is the strongest. Alternatively, the device may specify to select data streams from specific devices that are located in a certain physical locations specified. For example, the device may reside near the south gate of the sports stadium and it may specify to use the data stream from a first device near the North gate, a second device near the West gate, and a third device near the East gate of the same sports stadium. In this way, the device may acquire data from 4 different viewpoints of the stadium to generate an augmented reality data stream that captures the sports scene in a more complete manner.

The frameworks 100 or 200 may also be configured to perform centralized augmented reality data generation via crowd sourcing. In this scheme, data acquired by individual devices at different locations may be sent or made available to the augmented reality data generator 150. Augmented reality data are generated by the augmented reality data generator 150 based on e.g., what is requested either expressed in the subscription database 140 or via an on-demand request. The subscription may be connected to accounts associated with either individual devices (e.g., individual accounts) or groups of individual devices (e.g., group accounts). Associated with each account, the subscription data may include specification of desired data (e.g., video), selection criteria in terms of quality (e.g., audio with less noise), location (e.g., from the same locale), or volume (e.g., limited to two best sources from the crowd).

The augmented reality data generator 150 may also generate augmented reality data in a centralized manner in response to on-demand request, as shown in FIG. 1C. Such an on-demand request may be generated by a device (e.g., via an application user interface which allows a user to specify various conditions associated with the on-demand for augmented reality data) and sent to the augmented reality data generator 150. The on-demand request may be processed by the augmented reality data generator 150 in a similar manner as it does with respect to a subscription except the on-demand request may be transient and once satisfied, it may not be stored so that it may be used next time.

In some embodiments, augmented reality data may also be generated in a manner that is neither centralized not individual based. That is, this corresponds to a semi-distributed operation mode, in which augmented reality data may be generated in connection with a group of devices by a selected member device (e.g., a master of the group) on behalf of other group members. In this mode of operation, individual devices may be freely organized into groups and each group may have a designated master device and others in the group may correspond to slave devices so that the slave devices agree to a profile to be used to generate augmented reality data and the master device is responsible for selecting crowd sources based on the profile, generating the augmented reality data, and distribute the generated augmented reality data to the member devices.

The framework 100 or 200 may operate in a hybrid operational mode in which individual devices may act on their own in a distributed manner, the augmented reality data generator 150 may act in a centralized manner to generate centralized augmented reality data according to either subscription or real time demand, and different groups of individual devices may be organized to act in a semi-distributed manner to serve the interests/demands of different groups of individual devices. An individual device may participate in different modes of operation. For instance, it may operate on its own in a distributed mode to generate its own augmented reality data. It may also subscribe with the augmented reality data generator 150 on some other augmented reality data and in may also be a member device of some groups, either as a master of a group or a slave in others.

Figure 1D:
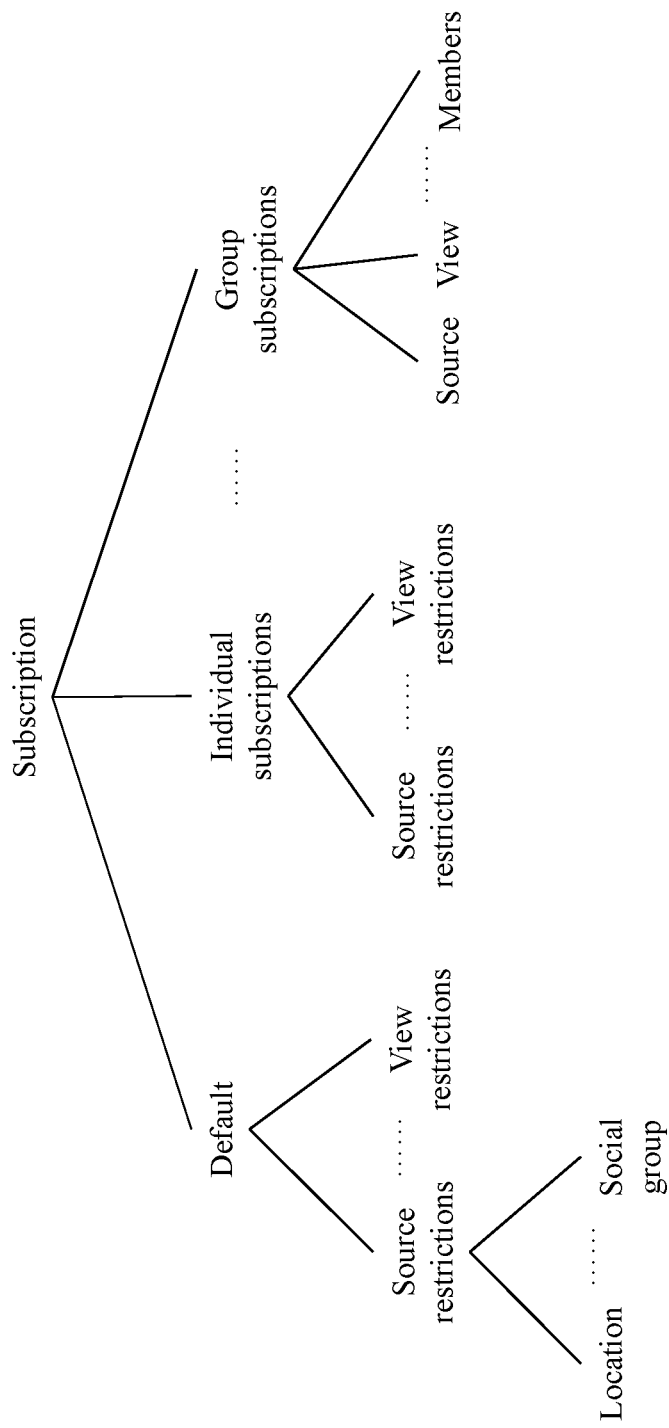
FIG. 1D illustrates exemplary ways to subscribing augmented reality data to be generated via crowd sourcing, in accordance with an embodiment of the present teaching.

As discussed herein, different individual devices or groups of devices may subscribe augmented reality data to be generated by the augmented reality data generator 150. FIG. 1D illustrates exemplary ways to subscribing augmented reality data to be generated via crowd sourcing, in accordance with an embodiment of the present teaching. As shown, each account registered in the subscription database 140 may specify specific subscription type such as a default setting, an individual subscription, . . . , or a group subscription. Each type of subscription may be organized to include, e.g., source restrictions, . . . , and view restrictions. A source restriction may be related to conditions by which data from crowd may be selected as a source, e.g., select the data from three designated devices with device IDs. The source restriction may also specifically provide location of the data source or in some embodiments, the source may be restricted to, say a social group.

Figure 2A:
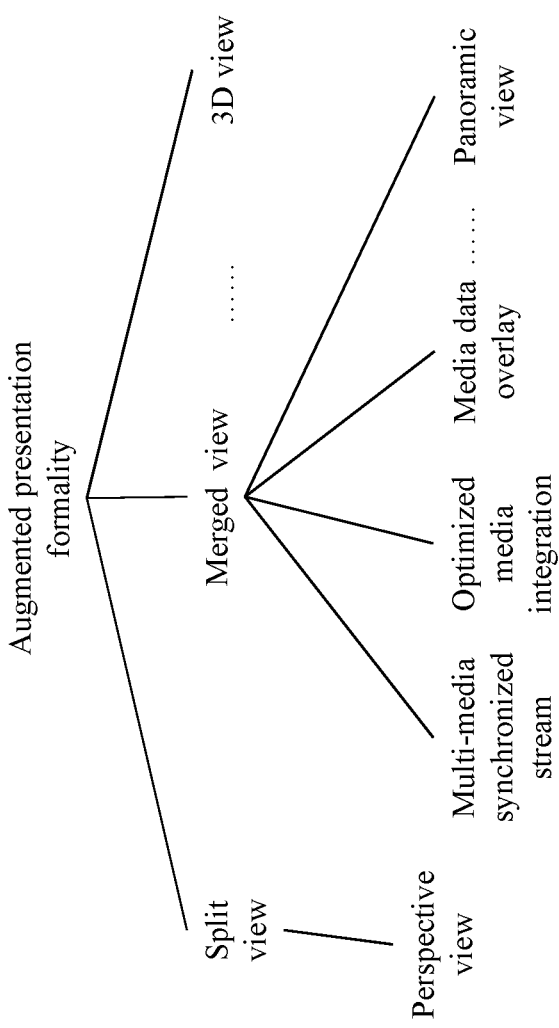
FIG. 2A provides exemplary way of combining data collected via crowd sourcing to generate augmented reality data, in accordance with an embodiment of the present teaching.

A view restriction may be provided to specify how data from crowd sources may be combined to generate an augmented view. For instance, data from two sources will be presented individually side by side so that the user of the device can see both views simultaneously. For a subscription associated with a group, the subscription may also specify the members of the group. FIG. 2A provides exemplary ways of combining data collected via crowd sourcing to generate augmented reality data, in accordance with an embodiment of the present teaching. As illustrated, augmented reality data to be generated based on data collected via crowd sourcing may be created as a split view, a merged view, . . . , or a 3D view. FIGS. 2B-2E illustrates corresponding exemplary augmented reality views generated via crowd sourcing, in accordance with an embodiment of the present teaching. FIG. 2B presents an exemplary split view where view 1 and view 2 present data from different individual devices capturing, e.g., data representing different viewpoints so that the user can see data streams of the same scene in different angles.

FIG. 2C illustrates a display format of an exemplary augmented reality data generated by superimposing or overlaying data stream from one device on data stream from another device. For instance, as shown, view 2 may be displaying a data stream of a closer view of, e.g., a sports player, captured by a device (camera) that is much closer to the character of interest (the sports player). The view 1 may correspond to an overall view of the sports playing field captured by a device (camera) that is located much farther from the playing field. In this exemplary overlay view, two data streams from two devices are also displayed simultaneously and although a user of each device only captured one view, he/she is able to watch a view captured by another device at the same time via the framework as disclosed herein.

In some embodiments, a combined augmented reality data may not be simply display data from multiple cameras simultaneously. Instead, data stream of different modalities may be combined in a synchronized manner to provide a synchronized multimedia data stream. For example, one camera may acquire the pictorial information of a video, a second device may be configured to capture acoustic information of the same event, and a third device may be configured to capture the textual information related to the commentary of the event. Depending on the need, such three streams may be combined to generate different augmented reality data streams. For example, one user may prefer to combine the visual information with commentary without the actual audio of the event. In another scenario, multiple devices may record the audio stream of a sports game, some devices are located far away from the center of action, and some are pretty close.

The recorded visual information may be selectively combined (synchronized) with the audio data stream that represents the best quality of audio recording to generate enhanced or augmented reality data. This is illustrated as optimized media integration. In some embodiments, transcription of audio may be obtained on the fly and then the textual output stream may be superimposed or overlay on the visual data stream in a synchronized manner. This is illustrated in FIG. 2A as media data overlay and as illustrated in FIG. 2D. In some embodiments, the augmented reality data may be generated by stitching data from different devices in a smart way to generate, e.g., a panoramic view of the scene that each of the different devices captured only a portion of. This is illustrated in FIG. 2E. Other alternative augmented reality data include 3D views which may be generated based on data captured from different perspectives of the same scene.

Figure 3A:
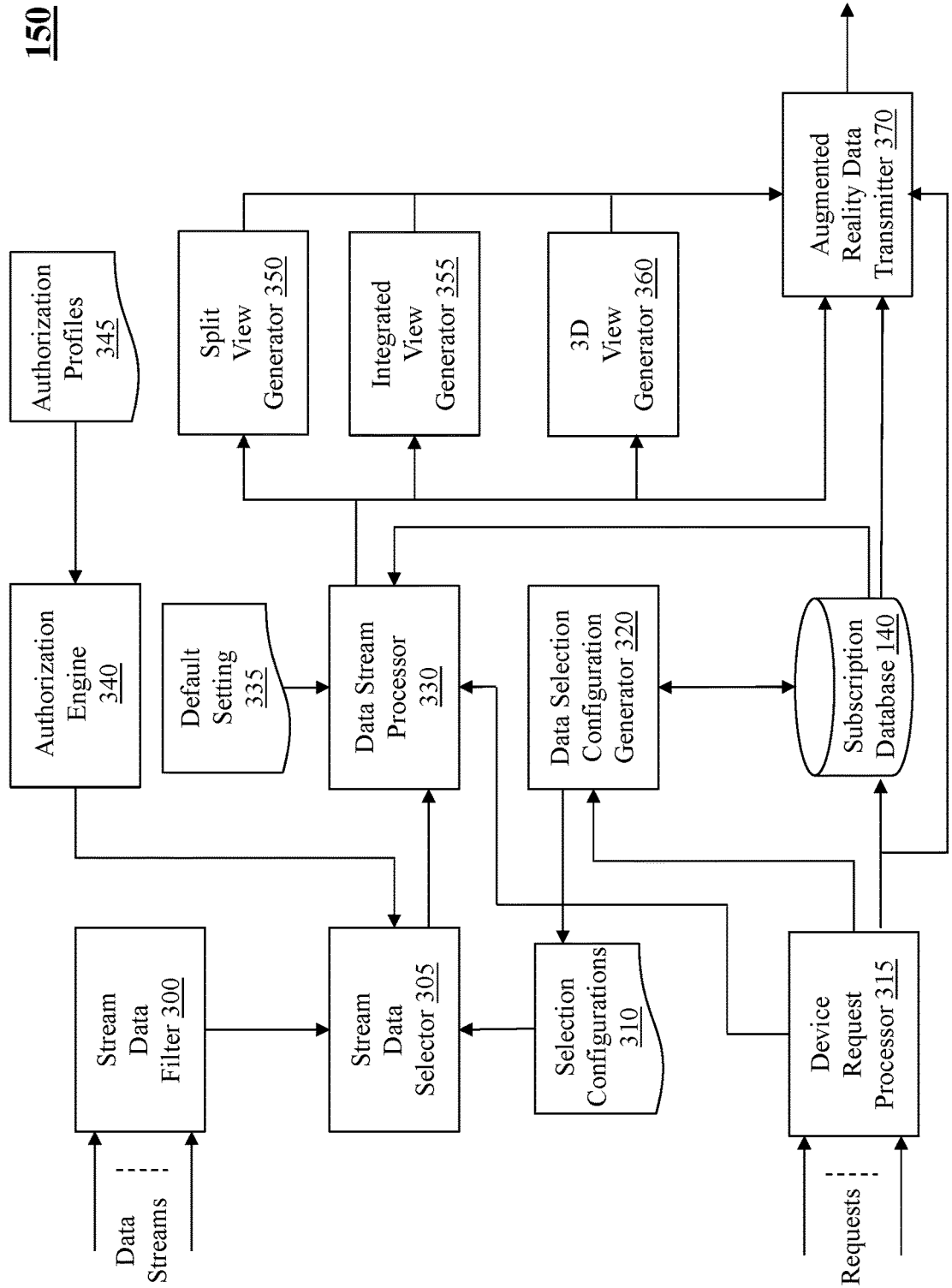
FIG. 3A depicts an exemplary high level system diagram of an augmented reality generator, in accordance with an embodiment of the present teaching.

To realize the framework 100 or 200 as discussed herein, each device may be implemented with certain functionalities to enable the operation. Similarly, the augmented reality data generator 150 may be implemented to achieve different functionalities to support the operations described herein. FIG. 3A depicts an exemplary high level system diagram of the augmented reality generator 150, in accordance with an embodiment of the present teaching. In this illustrated embodiment, the augmented reality data generator 150 comprises components to filter received stream data (e.g., to filter out bad quality data streams), to select some of the received data streams (e.g., based on subscription or an on-demand request on-the-fly), to process selected stream data for generating augmented reality data, and to actually generate augmented reality data stream based on what is required (either by subscription or by on-demand request).

Specifically, the augmented reality data generator 150 in the illustrated embodiment comprises a stream data filter 300, a stream data selector 305, a data stream processor 330, a number of components, each of which is responsible for generating a specific type of augmented reality data based on multiple data streams, including a split view generator 350, an integrated view generator 355, and a 3D view generator 360, as well as augmented reality data transmitter 370 that distributes augmented reality data to appropriate devices. Optionally, the augmented reality data generator 150 may also include components for establishing the subscription information stored in the subscription database 140. The subscription information specified by an individual device (either representing a user operating the device or a group of users in a group setting) may be used to specify, e.g., source restrictions and view restrictions. The former may be used to determine what data streams to be selected for the augmented reality view and the latter may be used to determine how multiple selected data streams may be combined to form an augmented reality view. In some embodiments, the augmented reality data generator 150 may also operate based on real time on-demand request received from individual devices. Such an on-demand request may represent a request from a single device or a request from a group of devices (the request may be sent by a representative device of the group such as a master device).

To facilitate subscription/request based operation, the augmented reality data generator 150 may also include a device request processor 315 and a data selection configuration generator 320. When a request for a subscription is received to establish a subscription record, the device request processor 315 may process the request, extracting information specifying the subscription and stored such subscription information in the subscription database 140. Such stored subscription information may then be used by the data selection configuration generator 320 to generate selection configurations 310 which may be relied on to select desired data streams. If a request corresponds to a real time on-demand request, the device request processor 315 processes the on-demand request and output its result to the data selection configuration generator 320 so that a selection configuration may be generated for the on-demand request. With such established data selection configuration, the stream data selector 305 may choose appropriate data streams to be used in generating augmented reality data.

As another option, the augmented reality data generator 150 may also include certain authorization mechanism that may be used to authenticate or authorize, by an authorization engine 340, access to certain data streams based on, e.g., some pre-determined authorization profiles stored in 345. Once the data streams are selected, such data streams are used to generate augmented reality data based on information specified, including a default setting (if neither subscription information nor an on-demand request exists), a subscription (from the subscription database 140), or an on-demand request (constructed by the device request processor 315), as shown in FIG. 3A. Based on the specification of how the augmented reality data are to be generated, the data stream processor 330 processes the multiple streams of data accordingly for the specified augmentation and invokes an appropriate component (the split view generator 350, the integrated view generator 355, or the 3D view generator 360) to generate the requested augmented reality data stream. The generated augmented reality data are then sent to the augmented reality data transmitter 370, which then sends the data to a corresponding device based on the subscription data or on-demand request, as shown in FIG. 3A.

Figure 3B:
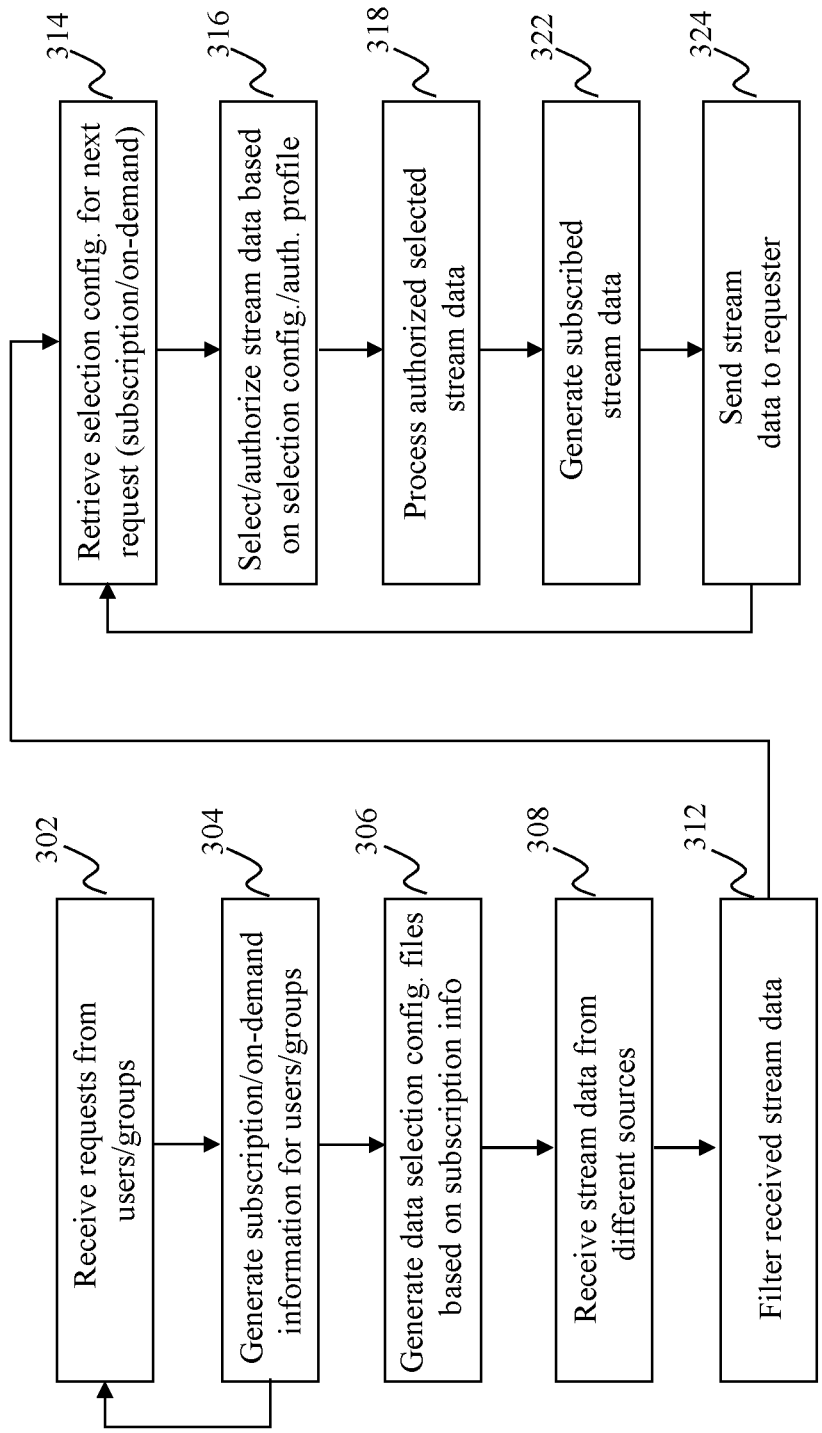
FIG. 3B is a flowchart of an exemplary process of an augmented reality generator, in accordance with an embodiment of the present teaching.

FIG. 3B is a flowchart of an exemplary process of the augmented reality generator 150, in accordance with an embodiment of the present teaching. To establish information regarding what augmented reality data are to be generated, the device request processor 315 in the augmented reality data generator 150 first receives, at 302, one or more requests from corresponding devices. Such received requests may correspond to subscriptions for services or on-demand requests for obtaining augmented reality data. The received requests are processed to identify relevant information in order to generate, at 304, either the subscription information or on-demand information for the underlying users/groups. The generated subscription information may be stored in the subscription database 140 and can be used by the data stream processor 330 to process data streams from different sources in order to generate the requested augmented reality data. If a request is an on-demand request, the generated on-demand request information may be sent to the data stream processor 330 directly for accordingly generating the requested augmented reality data.

The relevant information extracted from requests (either for subscription or for on-demand requests) may then be used by the data selection configuration generator 320 to generate, at 306, corresponding data selection configurations stored in the data selection configuration archive 310. For each request, a corresponding data selection configuration may be stored and used in operation to select certain data streams to compose the requested augmented reality data. In operation, when data are received from devices 110, at 308, at the stream data filter 300, such data may be filtered at 312 before data selection is performed. For example, the initial filtering may include filtering out data streams that are unstable or intermittent to, e.g., ensure quality.

According to the present teaching, the augmented reality data generator 150 received data (or data streams) from the devices 110 and for some of the devices, augmented reality data need to be generated in accordance with their subscription of on-demand requests. To generate augmented reality data for each device (that either subscribed or sent on-demand request), data to be used for generating the requested augmented reality data may first be selected and then used for creating the augmented reality data. As shown, the filtered data streams from the stream data filter 300 may be sent to the stream data selector 305 so that data streams to be used for generating augmented reality data may then be selected for each request based on a corresponding data selection configuration. This is achieved by retrieving, at 314, a selection configuration for the next request, which is then used by the stream data selector 305 to determine, at 316, specific data streams to be used for generating the augmented reality data. As discussed herein, the restrictions on sources of data may be provided in the subscription or in an on-demand request. For instance, although there may be hundreds of devices that are connected to the augmented reality data generator 150, a specific subscription/request may specify that only three data streams should be selected to generate the augmented reality data based on certain specified criteria, e.g., three devices that are located at certain coordinates.

In some embodiments, data streams to be used for composing augmented reality data may also need to be authorized. This may be achieved by requiring an authorization from the authorization engine 340 in accordance with, e.g., authorization profiles stored in 345. For instance, parental control may be realized by establishing appropriate authorization profiles and during the operation, the authorization engine 340 may be invoked to authorize, at 316, each selected data stream based on a stored corresponding authorization profile. In some embodiments, the authorization engine 340 may also be used to optimize the selection of data streams used to generate augmented reality data. For example, to generate a presentation of a sports game with good visual view of the game as well as good audio quality on commentary, stream data may be acquired by different devices present at different locations of the sports stadium. Visual data streams and audio data streams may be assessed as to quality (e.g., the visual data are stable and steady and audio data are audible with clear speeches) so that only the best visual and audio data from different sources are authorized to be used to generate a data stream that present synchronized audio/visual information.

To generate augmented reality data, the data stream processor 330 may then process, at 318, the selected and/or authorized data streams from the stream data selector 305 and generate augmented reality data based on such processed data streams in accordance with the subscription or on-demand request. For example, if a subscription is for overlay data streams by superimposing the display of one data streams at a specified location of the display of another data stream (see FIG. 2C), the data stream to be superimposed in a much smaller display window may be downsized first before carrying out the superimposition. To generate a panoramic view based on data from multiple sources, each data set from one source may be processed with respect to adjacent pictures to determine where in each picture the stitches are to be performed.

Based on the processed data from multiple sources in accordance with the requirements of the augmented reality data, the data stream processor 330 then invokes, according to the subscription or on-demand request, an appropriate component to generate, at 322, corresponding augmented reality data. For instance, if a subscription requests for a merged view of different media data from different sources in a synchronized manner, the integrated view generator 355 is invoked to synchronize and merge the selected/authorized data from the data stream processor 330. Similarly, if a subscription requests for a panoramic view of the scene, visual data from devices located at different locations forming an approximate horizon line may be selected/authorized to generate an augmented panoramic view. Such generated augmented reality data are then sent, at 324, to the device that requested the augmented reality data. In some situations, the device that requests the augmented reality data is an individual device. In some situations, the device that requested the augmented reality data may correspond to a master device in a group that obtains the augmented reality data on behalf of its group members and will subsequently forwarding the received augmented reality data to its group members.

Figure 4A:
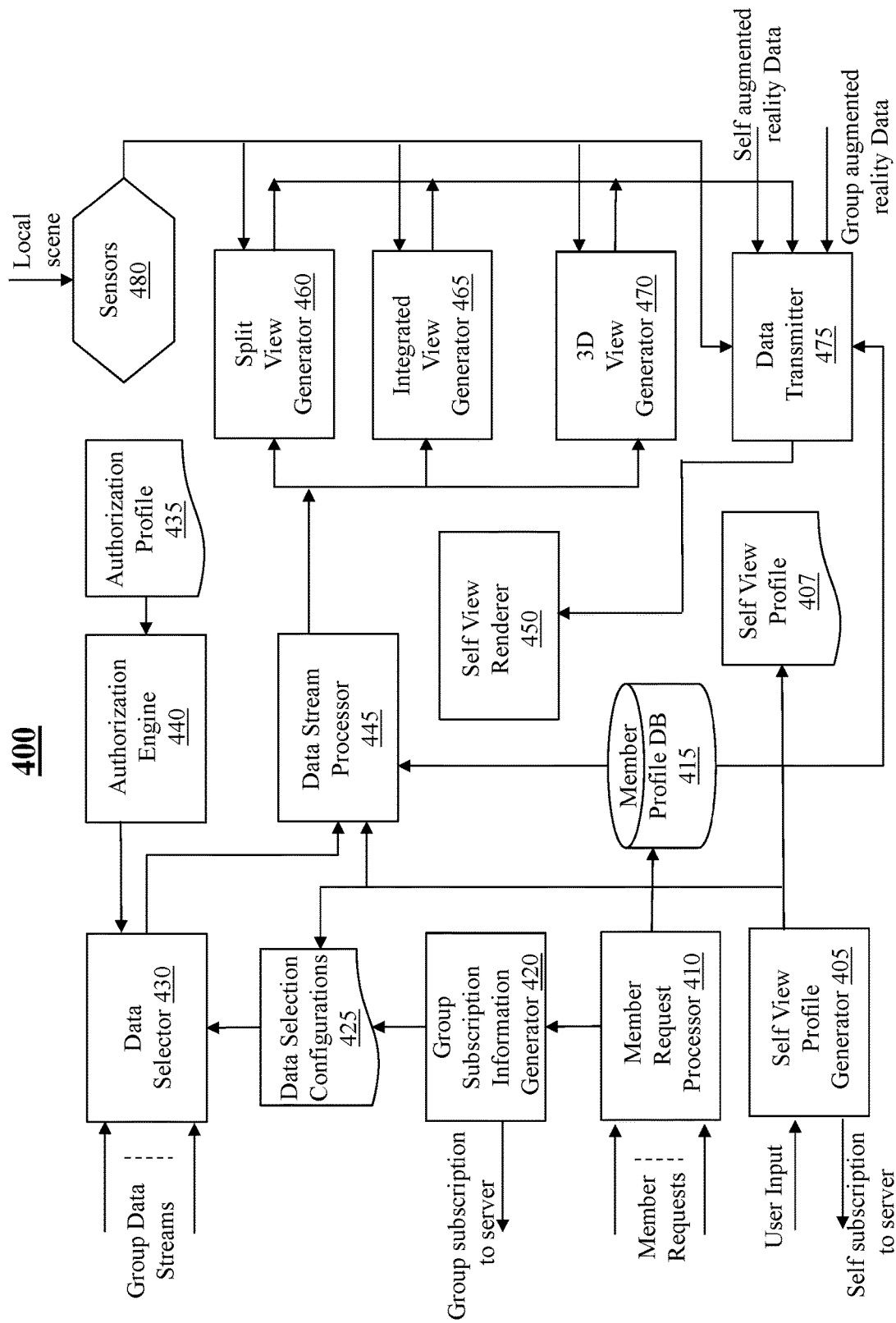
FIG. 4A depicts an exemplary high level system diagram for a group master responsible for obtaining augmented reality data for a group of members via crowd sourcing, according to various embodiments of the present teaching.

FIG. 4A depicts an exemplary high level system diagram for a group master device 400 responsible for obtaining augmented reality data for its members via crowd sourcing, according to various embodiments of the present teaching. The group master device 400 is constructed partially in a similar way as the augmented reality data generator 150. This part includes a member request processor 410 (similar to device request processor 315), a group subscription information generator (similar to data selection configuration generator 320), a data selector 430 (similar to stream data selector 305), a data stream processor 445 (similar to data stream processor 330), an authorization engine 440 (similar to the authorization engine 340), a split view generator 460 (similar to the split view generator 350), an integrated view generator 465 (similar to the integrated view generator 355), a 3D view generator (similar to the 3D view generator 360), and a data transmitter (similar to the augmented reality data transmitter 370). Through this part of the group master device 400, it is configured for gathering its member's requests, generating data selection configurations based on its members' requests, selecting data streams according to its members' data selection configurations, processing the selected data for generating augmented reality data for its members, generating the augmented reality data accordingly, and transmitting the generated augmented reality data to its members.

In this part of the operation, when the group master device 400 receives from its members requests, the member request processor 410 processes such requests and generates member profiles in member database 415 and data selection configurations in 425. When data from multiple sources are received (which includes the data captured by the group master device 400 in its own space), the data selection configurations for its members are used by the stream data selector 430 to select data from a limited number of sources. Such sources may also be determined based on an input from the authorization engine 440. The selected data streams are then processed by data stream processor 445 based on the member profiles retrieved from the member profile database 415. The processed data streams are then sent to an appropriately invoked components (460, 465, or 470) in accordance with the members' requirements of the form of the augmented reality data. The invoked component (460, 465, or 470) generates the members' augmented reality data and sends to the data transmitter 475, which then transmits the augmented reality data generated to the appropriate group members based on the information stored in the member profile database 415.

The difference between this part of a group master device and the augmented reality data generator 150 may be related to the scope of the services, i.e., the group master device's service scope is limited to the members of the group while the service scope of the augmented reality data generator 150 is directed to all devices, including group members and individual devices. Instead of generating augmented reality data for its group members, the group master device 400 may alternatively subscribe augmented reality data from the augmented reality data generator 150 by submitting a group subscription, either on behalf of some of its group members or on behalf of all group members, to the augmented reality data generator 150 and in turn receive the subscribed augmented reality data from the augmented reality data generator 150. In this mode of operation, once the group master device 400 receives the subscribed augmented reality data, it may simply forward to some or all of its group members. In some embodiments, the group master device 400 may subscribe augmented reality data from the augmented reality data generator 150 for some of its members (e.g., the requested augmented reality data such as 3D view may require the computational resources more than the group master device 400 can provide) and generate augmented reality data for other group members.

Another different aspect of the group master device 400 is that it may also be configured to act on its own as an individual device. In this capacity, the group master device 400 includes sensors 480 that are configured to acquire data in the locale the device 400 is situated and send such acquired data to the data transmitter 475 to the network 120 to enable the disclosed media data crowd sourcing. Such acquired data may be in a single modality or in multiple modalities. The acquired data may be transmitted in a broadcast mode so that all devices, including devices 110 and the augmented reality data generator 150 are able to receive them.

In addition to contributing acquired data to enable crowd sourcing, the group master device 400 may also obtain the augmented reality data of interest. In some embodiments, the group master device may send its own subscription to the augmented reality data generator 150 for its desired augmented reality data and receive the subscribed augmented reality data from the augmented reality data generator 150 and then renders on its display of the received augmented reality data. As another alternative, the group master device may create its own augmented reality data. To do so, it may be configured to generate self-prescribed profile about how to compose its own augmented reality data (separately from the group) and use such a profile to generate self-prescribed augmented reality data. For example, such a self-prescribed profile may be used to select data from multiple sources (whether it is from the group members or any other device), perform data processing on the selected data, generate self-prescribed augmented reality data based on the processed selected data, and render the self-prescribed augmented reality data on the device.

Figure 4B:
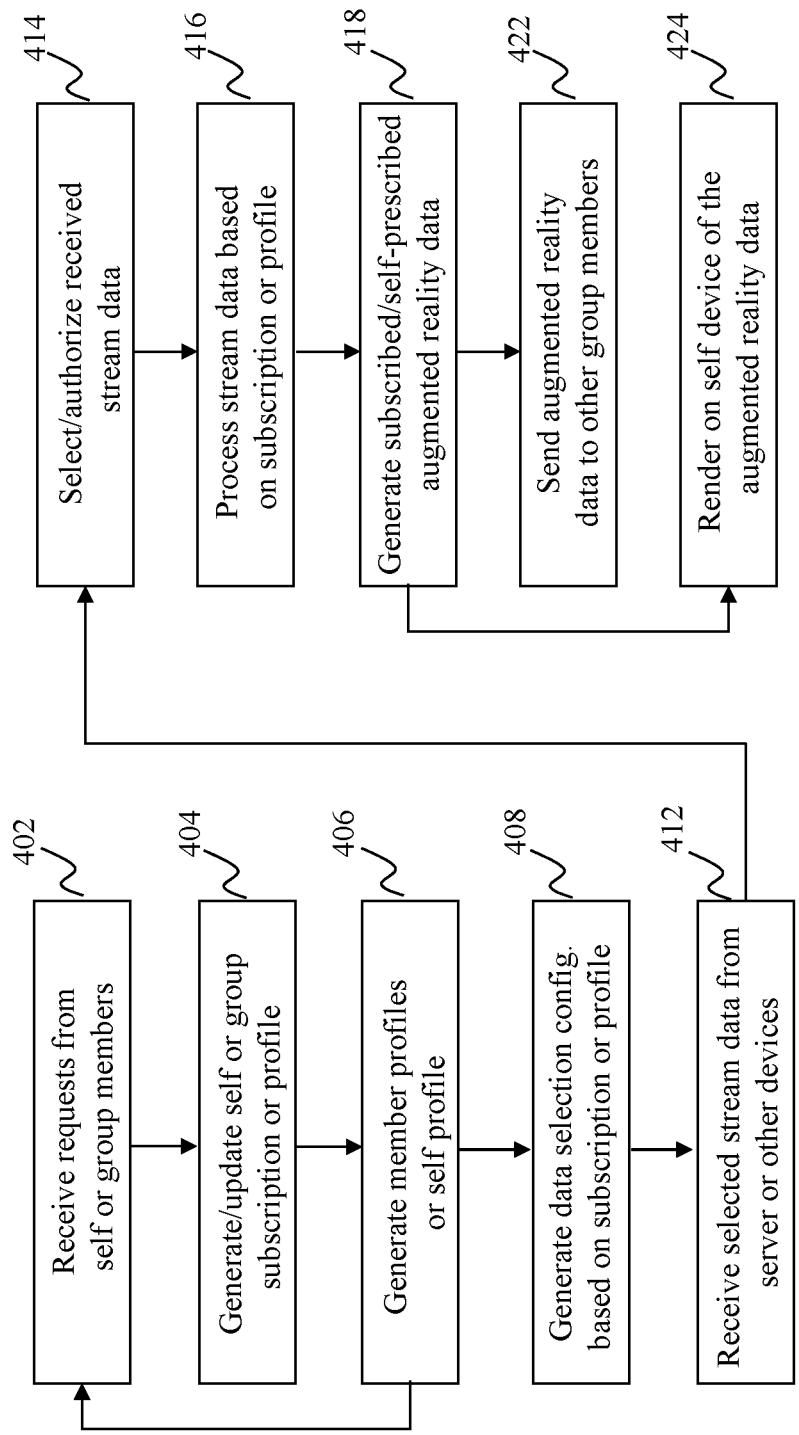
FIG. 4B is a flowchart of an exemplary process of a group master device for generating augmented reality data for a group of members via crowd sourcing, in accordance with an embodiment of the present teaching.

FIG. 4B is a flowchart of an exemplary process of the group master device 400 for generating augmented reality data for a group of members via crowd sourcing, according to an embodiment of the present teaching. The process as depicted in FIG. 4B is directed to the mode of generating augmented reality data by the group master device 400. Steps 402-406 continuously receive requests (either from group members or from the user of the group master device), process such requests, and generate subscription information (for the group members) and profile information, which can be used in requesting and generating augmented reality data. Based on the subscription or profile information of the group members or the user of the group master device, the group subscription information generator 420 sends the subscription information to the augmented reality data generator 150 and generates, at 408, the data selection configurations 425.

When data streams from multiple sources are received, at 412, by the stream data selector 420, it selects, at 414, certain stream data from some of the sources based on the data selection configurations 425. In some embodiments, the data selection may also be controlled by the authorization engine 440 based on some pre-defined authorization profile 435. The selected/authorized data streams are then processed, at 416, by the data stream processor 445. Based on the processed data, the data stream processor 445 invokes an appropriate augmented reality data generation components (460, 465, or 470) according to the group members' subscription to generate, at 418, the subscribed augmented reality data. Such generated augmented reality data for the group members may then be transmitted, at 422, to the corresponding group members based on the member information stored in the database 415.

In some embodiments, when the group master device 400 also develops its own augmented reality data/view, the data stream processor 445 may also generate, at 418, the self-prescribed augmented reality data according to the self-view profile 407 and such generated self-prescribed augmented reality data are then rendered, at 424, on the group master device 400.

Figure 4C:
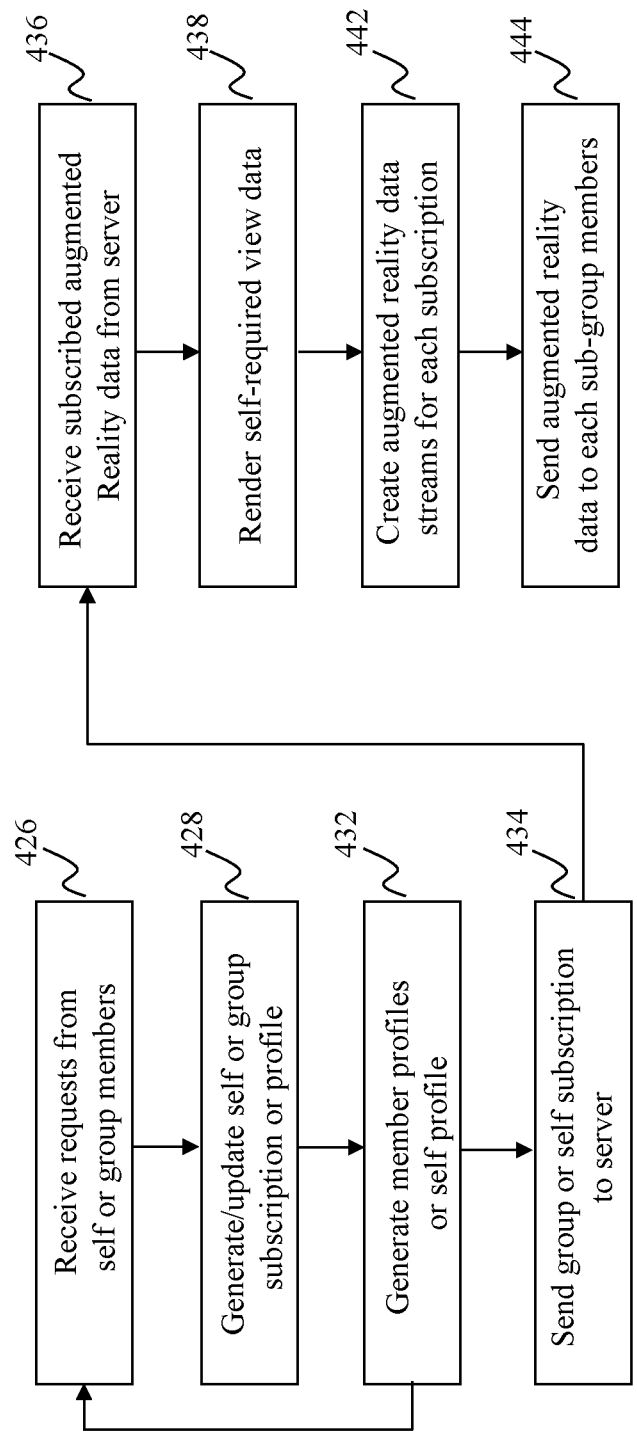
FIG. 4C is a flowchart of an exemplary process of a group master device for obtaining augmented reality data generated by a server via crowd sourcing, in accordance with an embodiment of the present teaching.

FIG. 4C is a flowchart of an exemplary process of the group master device 400 for obtaining augmented reality data generated by a server via crowd sourcing, according to an embodiment of the present teaching. This process is directed to the operation mode in which, instead of generating augmented reality data at the group master device 400, it sends subscription for the group to the augmented reality data generator 150 and receives the subscribed augmented reality data generated by the augmented reality data generator 150 via crowd sourcing. In the process directed to this mode of operation, steps 426-432 perform the same as steps 402-406. Once the subscription information is generated at step 428, the group master device 400 sends, at 434, the group subscription and/or the self-subscription to the augmented reality data generator 150. Then it waits to receive the subscribed augmented reality data from the augmented reality data generator 150. In some embodiments, the subscription for group members may be for all or for some group members. In some embodiments, the group master device 400 may send multiple subscriptions to the augmented reality data generator 150, each of the subscriptions may correspond to a sub-group of the members.

When the group master device 400 receives, at 436 from the augmented reality data generator 150, the subscribed augmented reality data (which may include multiple data streams, each of which corresponds to one subscription directed to a sub-group of members or to the self-prescribed subscription), it renders its own view on the device at 438. To distribute the received augmented reality data directed to other group members, the group master device 400 may then create, at 442 according to the subscriptions, individual augmented reality data streams directed to the sub-groups of members and then send, at 444, each augmented reality data stream to a sub-group of members according to their corresponding subscriptions.

Figure 5A:
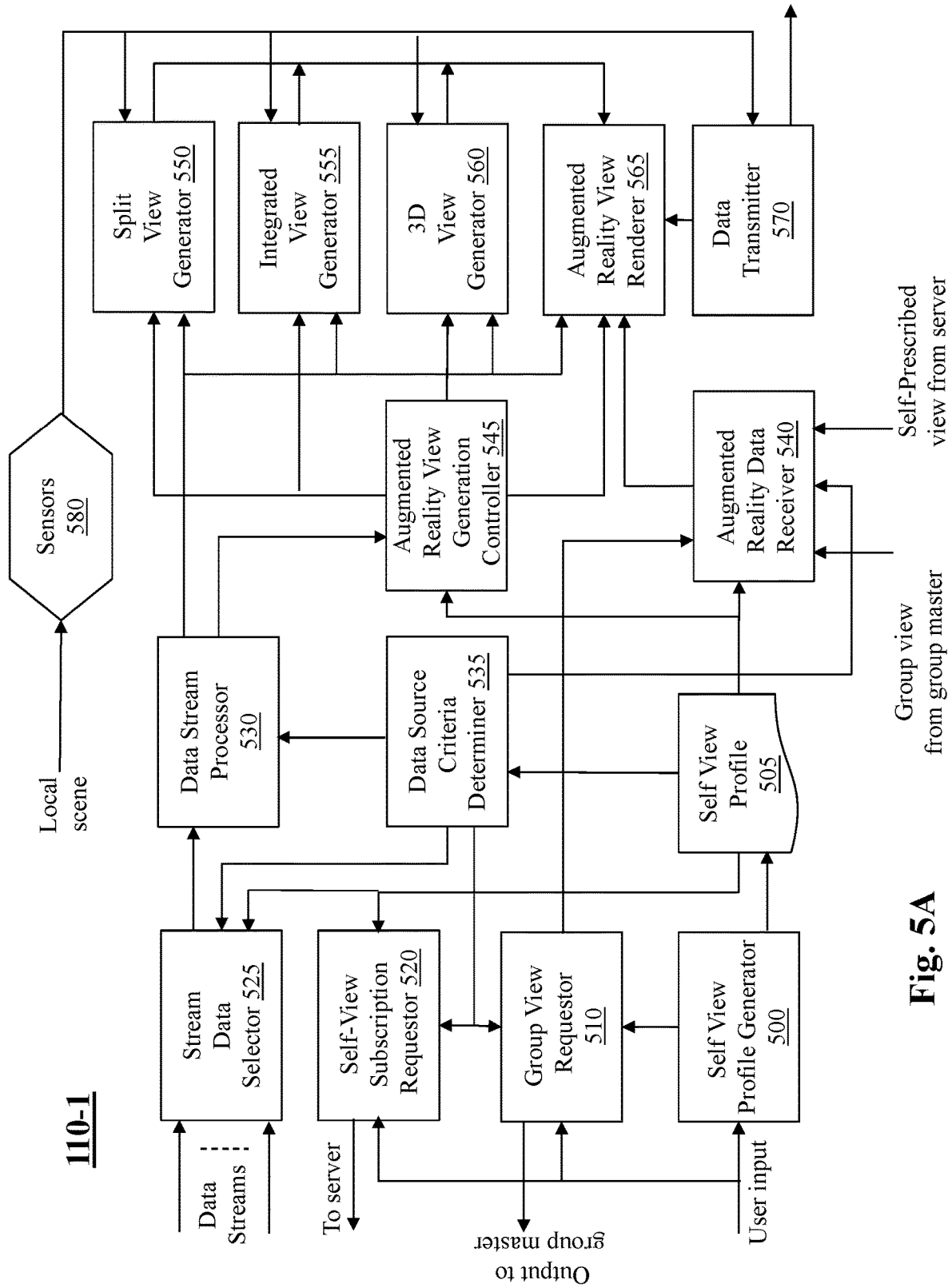
FIG. 5A depicts an exemplary high level system diagram of a user device capable of participating in data crowd sourcing and generating augmented reality data, in accordance with an embodiment of the present teaching.

FIG. 5A depicts an exemplary high level system diagram of an individual device capable of participating in media data crowd sourcing to enable generation of augmented reality data, in accordance with an embodiment of the present teaching. The exemplary construct of the individual device participating in generating augmented reality data generation via media data crowd sourcing is capable of operating in different modes of operation, which include generating augmented reality data at the device based on media data from different sources, obtaining augmented reality data from a group master device, and subscribing with and obtaining from a server (i.e., the augmented reality data generator 150) the needed augmented reality data.

In this exemplary system diagram, the individual device, e.g., 110-1, includes a part that performs similar functionalities as what is done by the augmented reality data generator 150 and/or the group master device 400 such as selecting data streams based on needs, processing the selected data streams, and generating the self-prescribed augmented reality data by invoking an appropriate augmented reality data generation components (for split view, merged view, or a 3D view). This part includes a stream data selector 525, a data stream processor 530, an augmented reality view generation controller 545, a split view generator 550, an integrated view generator 555, a 3D view generator 560, an augmented reality view renderer 565, and a data transmitter 570. To facilitate media data crowd sourcing, the individual device 110-1 also includes sensors 580 configured for acquire media data of its local scene, which send the acquired data to the selected augmented reality data generation components (550, 555, or 560) so that data streams from other selected sources may be combined with the locally acquired data to generate augmented reality data. In addition, to make the locally acquired data to be available to other devices, the acquired local data are also send to a data transmitter 570 to broadcast the acquired local scene data to the network 120.

Instead of generating augmented reality data on the device based on data from other sources, the individual device 110-1 is also configured to obtain augmented reality data from a group master device and/or a server such as the augmented reality data generator 150. To achieve that, the individual device 110-1 also includes a self-view profile generator 500 that establishes a self-view profile 505 based on user input. Such a self-view profile may be used by a data source criteria determiner 535 which specifies to the stream data selector 525 on which data streams to be allowed or selected. For example, a user of the device 110-1 may desire to generate high quality augmented reality data related to a sports game with high quality overall view of the sports field, detailed view of a particular player superimposed on the overall view, and high quality commentary while the game is on-going. Based on this self-view profile, in the mode of generating augmented reality data on the device, the data source criteria determiner 525 may specify that only data streams of the overall field and the specific player may be accepted on the visual side and only audio streams that correspond to high quality audio of the commentator (e.g., clearly audible) can be accepted.

In the mode of operation in which the device 110-1 obtains the desired augmented reality data from other devices (e.g., from a group master device or a server such as the augmented reality data generator 150), such requirements or restrictions may also be used to generate subscription information to be sent to either a group master device or a server such as the augmented reality data generator 150 to subscribe the desired augmented reality data to be generated via media data crowd sourcing. This is done by the group view requestor 510 (to send the subscription to a group master device) and/or by the self-view subscription requester 520 (to send the subscription to, e.g., the augmented reality data generator 150). Once the subscription is sent, an augmented reality data receiver 540 in the device 110-1 waits to receive the subscribed augmented reality data from the group master device and/or the augmented reality data generator 150. The augmented reality data, once obtained (either generated by any one of the components 550, 555, or 560 or received by the augmented reality data receiver 540), will then be sent to the augmented reality view renderer 565.

Figure 5B:
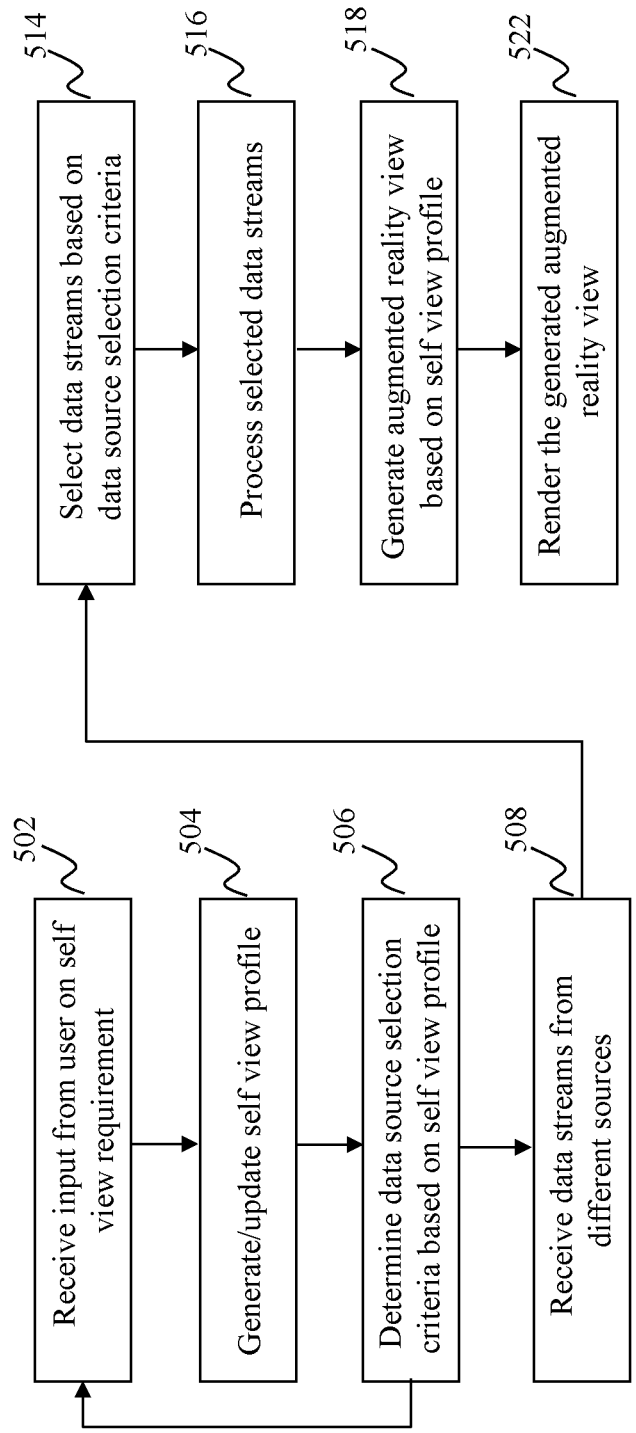
FIG. 5B is a flowchart of an exemplary process of an individual device configured for generating augmented reality data generation via media data crowd sourcing, in accordance with an embodiment of the present teaching.

FIG. 5B is a flowchart of an exemplary process of the individual device 110-1 configured for generating augmented reality data generation via media data crowd sourcing, in accordance with an embodiment of the present teaching. Steps 502-506 are directed to the operation of generating and updating profile for desired augmented reality views and accordingly generating data sourcing selection criteria to be used to select appropriate data streams from other sources. Once the data selection criteria are estimated based on desired augmented reality data, when data streams from different sources are received at 508, certain data streams are selected, at 514, based on the data selection criteria. Such selected data streams are then processed at 516 and the processed data streams from other sources are then combined with the locally acquire data to generate, at 518, augmented reality views based on instructions from the augmented reality view generation controller 545. Such instructions may be generated based on the self-view profile 515, specifying what is to be generated. The generated augmented reality views are then rendered, at 522, by the augmented reality view renderer 565.

Figure 5C:
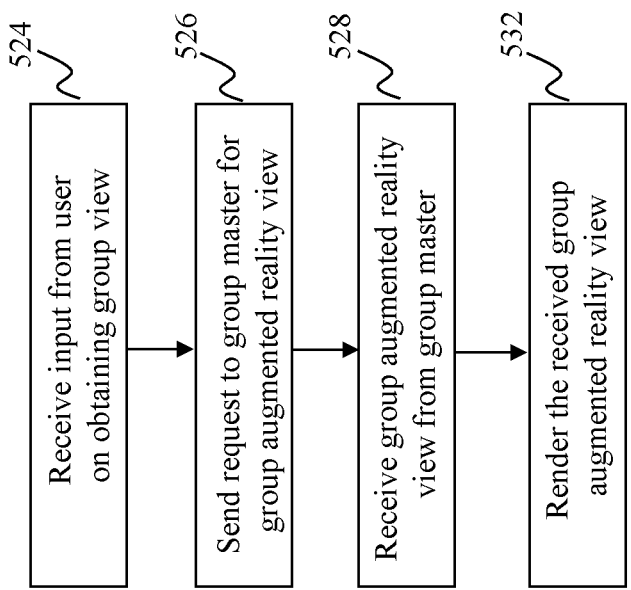
FIG. 5C is a flowchart of an exemplary process of an individual device that obtains augmented reality data generated elsewhere via media data crowd sourcing, in accordance with an embodiment of the present teaching.

FIG. 5C is a flowchart of an exemplary process of the individual device 110-1 that obtains augmented reality data generated elsewhere via media data crowd sourcing, in accordance with an embodiment of the present teaching. As discussed herein, instead of generating augmented reality data at the individual device 110-1, a different mode of operation is to subscribe desired augmented reality data from either a group master or from a server such as the augmented reality data generator 150. FIG. 5C is directed to the flow in which the device 110-1 subscribes and obtains desired augmented reality data from a group master. In operation, when the self-view profile generator 500 in the device 110-1 receives, at 524, input from a user regarding desired augmented reality view, it analyzes the input and sends the result to a group view requestor 510, which then sends, at 526, a subscription requester to a group master device for obtaining group augmented reality data. Then the augmented reality data receiver 540 waits and then receives, at 528, the requested augmented reality data from the group master, generated by utilizing media data from different sources via crowd sourcing. Such received group augmented reality data are then rendered, at 532 by the augmented reality view renderer 565 on the device 110-1.

Figure 5D:
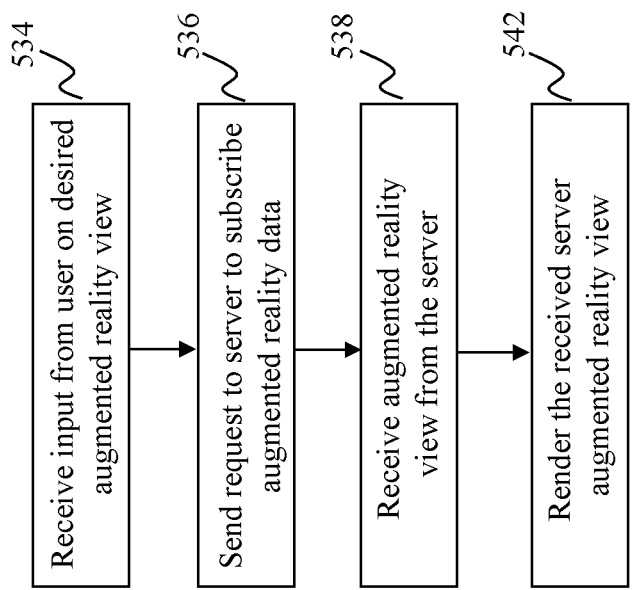
FIG. 5D is a flowchart of an exemplary process of an individual device to subscribe and obtain augmented reality data from a server generated via media data crowd sourcing, in accordance with an embodiment of the present teaching.

FIG. 5D is a flowchart of an exemplary process of the individual device 110-1 to subscribe and obtain augmented reality data from a server generated via media data crowd sourcing, in accordance with an embodiment of the present teaching. Upon receiving, at 534, input from a user on desired augmented reality data, the self-view profile generator 500 analyzes the input and generates the self-view profile 505, which is then used by the self-view subscription requestor 520 to generate a subscription request and send, at 536, to a server such as the augmented reality data generator 150. The augmented reality data receiver 540 waits and subsequently receives, at 538, the requested augmented reality data from the server and such received data are then sent to the augmented reality view renderer 565 to render the augmented reality view on the device 110-1.

Different embodiments are described above to generate augmented reality data in different modes of operations. Although each system components, such as the augmented reality data generator 150, the group master 400, or an exemplary individual device, may be described in terms of alternative modes of operation, these merely serve as illustration rather than limitations. Each of such components may operate in a mixed mode or a combine mode. For example, a group master may simultaneously operate in multiple modes, some group members may rely on the group master to generate augmented reality data, while others may rely on the group master as a pass through device to receive augmented reality data generated by a server. In addition, the self-view of a group master may or may not be the same as the group view obtained by the group master. Furthermore, an individual device may not necessarily use its own locally acquired data to generate augmented reality data, i.e., it may use only data from other devices to generate augmented reality data. Similarly, a group master may generate augmented reality data based on data from other devices without using its own data acquired locally.

Figure 6:
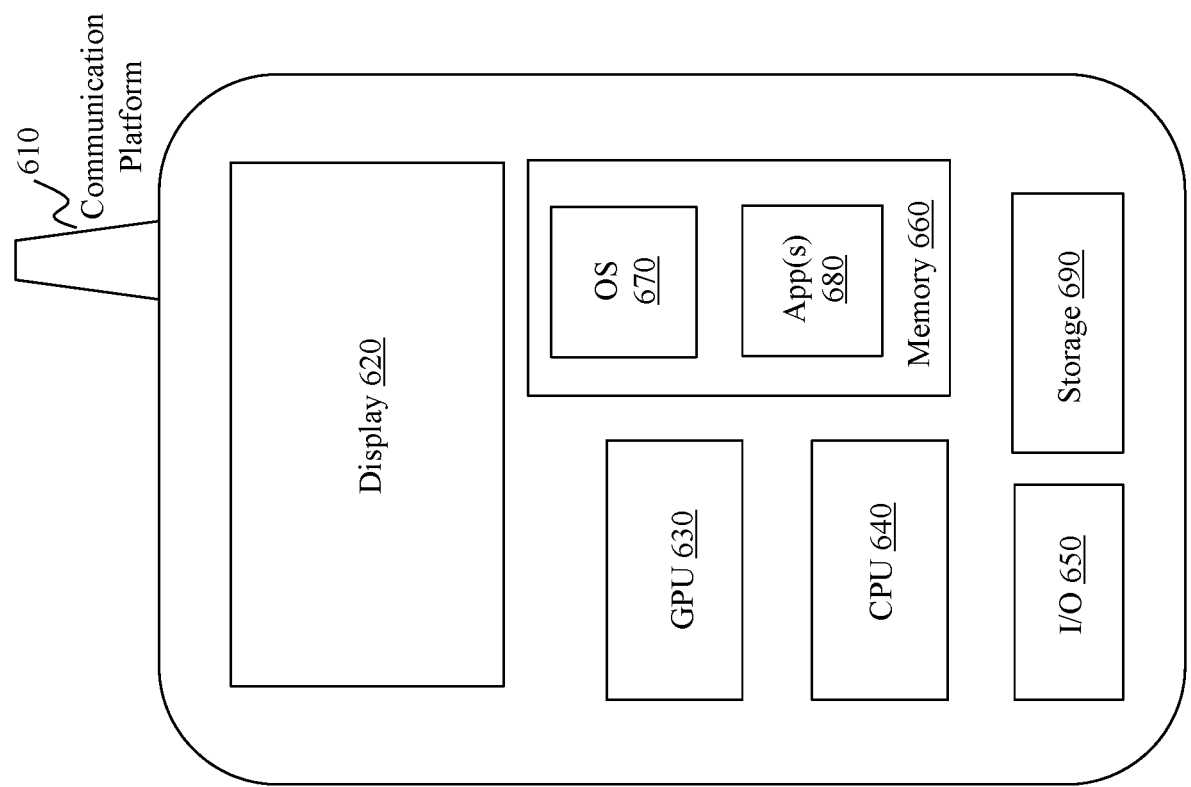
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching is implemented corresponds to a mobile device 600, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 640. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a browser or any other suitable mobile apps for managing a conversation system on mobile device 1400. User interactions may be achieved via the I/O devices 640 and provided to the various components connected via network(s) 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 700 may be used to implement any component of conversation or dialogue management system, as described herein. For example, conversation management system may be implemented on a computer such as computer 700, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM)

730, or random access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method implemented on at least one machine including at least one processor, memory, and communication platform capable of connecting to a network for augmenting data, the method comprising:
    obtaining data from different source devices associated with corresponding different users; and
    for each user of the different users,
        retrieving, from a subscription request or an on-demand request associated with the user, information that specifies a sub-set of the different users,
        determining, based on the information, the sub-set including the user and one or more other users,
        selecting data from source devices associated with the user and the one or more other users in the sub-set,
        generating the augmented data for the user based on the selected data, and
        sending the augmented data to the user based on the subscription request or the on-demand request, so that the augmented data is to be rendered on the source device associated with the user.

2. The method of claim 1, wherein the data comprise stream data, which includes at least one of video, audio, text, and any combination thereof.

3. The method of claim 1, wherein the user is one of an individual user associated with a corresponding one of the different source devices and a group of individual users represented by a corresponding one of the different source devices.

4. The method of claim 1, wherein the augmented data includes at least one of a split view, a merged view, and a three dimensional view, wherein the merged view includes a multimodal synchronized view, a media data overlay view, and a panoramic view.

5. The method of claim 1, wherein the step of obtaining the data comprises:
    receiving local data from a plurality of source devices, each of which resides in a geographical space and acquires local data associated with the geographical space;
    determining the different source devices from the plurality of source devices based on a criterion; and
    selecting the data from the local data acquired by the different source devices.

6. The method of claim 1, wherein the sub-set of the different source devices corresponds to source devices associated with a social group of the user.

7. The method of claim 1, wherein the step of retrieving comprises retrieving additional information that specifies how the data from the sub-set is combined to generate the augmented data, and
   wherein the step of generating comprises generating the augmented data for the user further based on the additional information.

8. A non-transitory machine-readable storage medium having information recorded thereon for augmenting data, wherein the information, when read by the machine, causes the machine to perform:
   obtaining data from different source devices associated with corresponding different users; and
   for each user of the different users,
      retrieving, from a subscription request or an on-demand request associated with the user, information that specifies a sub-set of the different users,
      determining, based on the information, the sub-set including the user and one or more other users,
      selecting data from source devices associated with the user and the one or more other users in the sub-set,
      generating the augmented data for the user based on the selected data, and
      sending the augmented data to the user based on the subscription request or the on-demand request, so that the augmented data is to be rendered on the source device associated with the user.

9. The medium of claim 8, wherein the data comprise stream data, which includes at least one of video, audio, text, and any combination thereof.

10. The medium of claim 8, wherein the user is one of an individual user associated with a corresponding one of the different source devices and a group of individual users represented by a corresponding one of the different source devices.

11. The medium of claim 8, wherein the augmented data includes at least one of a split view, a merged view, and a three dimensional view, wherein the merged view includes a multimodal synchronized view, a media data overlay view, and a panoramic view.

12. The medium of claim 8, wherein the step of obtaining the data comprises:
   receiving local data from a plurality of source devices, each of which resides in a geographical space and acquires local data associated with the geographical space;
   determining the different source devices from the plurality of source devices based on a criterion; and
   selecting the data from the local data acquired by the different source devices.

13. The medium of claim 8, wherein the sub-set of the different source devices corresponds to source devices associated with a social group of the user.

14. The medium of claim 8, wherein the step of retrieving comprises retrieving additional information that specifies how the data from the sub-set is combined to generate the augmented data, and
   wherein the step of generating comprises generating the augmented data for the user further based on the additional information.

15. A system for augmenting data comprising:
   a stream data selector configured for obtaining data from different source devices associated with corresponding different users; and
   a data stream processor configured for, for each user of the different users,
      retrieving, from a subscription request or an on-demand request associated with the user, information that specifies a sub-set of the different users,
      determining, based on the information, the sub-set including the user and one or more other users,
      selecting data from source devices associated with the user and the one or more other users in the sub-set,
      generating the augmented data for the user based on the selected data, and
      sending the augmented data to the user based on the subscription request or the on-demand request, so that the augmented data is to be rendered on the source device associated with the user.

16. The system of claim 15, wherein the data comprise stream data, which includes at least one of video, audio, text, and any combination thereof.

17. The system of claim 15, wherein the user is one of an individual user associated with a corresponding one of the different source devices and a group of individual users represented by a corresponding one of the different source devices.

18. The system of claim 15, wherein the augmented data includes at least one of a split view, a merged view, and a three dimensional view, wherein the merged view includes a multimodal synchronized view, a media data overlay view, and a panoramic view.

19. The system of claim 15, further comprising:
   a stream data filter configured for
      receiving local data from a plurality of source devices, each of which resides in a geographical space and acquires local data associated with the geographical space,
      determining the different source devices from the plurality of source devices based on a criterion, and
      selecting the data from the local data acquired by the different source devices.

20. The system of claim 15, wherein the sub-set of the different source devices corresponds to source devices associated with a social group of the user.

* * * * *